United States Patent
Beilis et al.

(10) Patent No.: US 10,262,317 B2
(45) Date of Patent: Apr. 16, 2019

(54) TECHNIQUE TO AUTHENTICATE IN A MOBILE APPLICATION USING NEAR-FIELD COMMUNICATION

(71) Applicant: Genesys Telecommunications Laboratories, Inc., Daly City, CA (US)

(72) Inventors: David Beilis, Toronto (CA); Adrian Lee-Kwen, North York (CA)

(*) Notice: Subject to any disclaimer, the term of this patent is extended or adjusted under 35 U.S.C. 154(b) by 735 days.

(21) Appl. No.: 14/797,061

(22) Filed: Jul. 10, 2015

(65) Prior Publication Data

US 2015/0317623 A1 Nov. 5, 2015

Related U.S. Application Data

(63) Continuation of application No. 13/568,960, filed on Aug. 7, 2012, now Pat. No. 9,084,114.

(51) Int. Cl.

| G06Q 20/32 | (2012.01) |
| H04W 4/80 | (2018.01) |
| H04L 29/06 | (2006.01) |
| H04M 1/725 | (2006.01) |
| G06Q 20/40 | (2012.01) |
| H04W 12/06 | (2009.01) |

(52) U.S. Cl.
CPC ....... *G06Q 20/3278* (2013.01); *G06Q 20/409* (2013.01); *H04L 63/0853* (2013.01); *H04M 1/72533* (2013.01); *H04W 4/80* (2018.02); *H04W 12/06* (2013.01)

(58) Field of Classification Search
CPC ..... H04W 12/06; H04W 4/008; H04W 4/001; H04W 12/08; H04W 4/00; H04L 63/08; H04L 63/0853; H04L 63/0492; H04L 63/18; G06Q 20/32; G06Q 20/3278; G06Q 20/10; G06Q 20/108; G06Q 20/40; G06Q 30/00; G06Q 20/20; G06Q 20/3821; G06Q 30/0601; H04M 2250/04
USPC ............. 455/410, 411, 41.1, 41.2, 41.3; 705/39–44, 41.38, 35, 64–79; 726/4–6, 726/27–30
See application file for complete search history.

(56) References Cited

U.S. PATENT DOCUMENTS

| 2004/0078307 | A1* | 4/2004 | Carver ............. G06Q 40/02 705/31 |
| 2005/0272445 | A1* | 12/2005 | Zellner ............. H04L 41/12 455/456.2 |
| 2006/0266822 | A1 | 11/2006 | Kelley et al. |
| 2008/0172317 | A1* | 7/2008 | Deibert ............. G06Q 20/10 705/35 |
| 2010/0078472 | A1* | 4/2010 | Lin ............. G06Q 20/32 235/379 |
| 2010/0226489 | A1 | 9/2010 | Sarkar et al. |
| 2011/0251955 | A1 | 10/2011 | Lam |
| 2011/0280403 | A1* | 11/2011 | DeLuca ............. H04L 67/16 380/278 |

(Continued)

*Primary Examiner* — Allahyar Kasraian (57) ABSTRACT

A method for operating a mobile communication appliance enabled for Near Field Communication (NFC) has steps for (a) positioning the communication appliance and an article associated with a person, the article enabled for NFC and storing a unique identifier, within a near-field threshold; (b) acquiring by the communication appliance through NFC the unique digital identifier from the article; and (c) using the identifier to select and initiate a particular functionality of the communication appliance.

16 Claims, 4 Drawing Sheets

(56) References Cited

U.S. PATENT DOCUMENTS

2012/0052800 A1    3/2012   Bona et al.

\* cited by examiner

TECHNIQUE TO AUTHENTICATE IN A MOBILE APPLICATION USING NEAR-FIELD COMMUNICATION

CROSS-REFERENCE TO RELATED APPLICATIONS

This application is a continuation of U.S. patent application Ser. No. 13/568,960, filed Aug. 7, 2012, the content of which is incorporated herein by reference.

BACKGROUND OF THE INVENTION

1. Field of the Invention

The present invention is in the technical area of telecommunication, and relates more particularly to authentication of persons to mobile applications and agents.

2. Description of Related Art

It is well-known in the digital communication arts that it is often necessary for a caller, upon reaching, for example, an agent in a call center, to provide some input to authenticate the caller as the person he or she claims to be. One notoriously well known means of accomplishing this need is by the caller entering a password known to the agent or to the digital equipment available to the agent. In addition an agent may require other information presumably known only to the proper person, to aid in authorization. Authentication is also necessary in logging into an account on a web page, such as an on-line banking account through a web page.

It is also known that mobile devices, by virtue of increasing computing power and ability to send and receive data, are becoming more and more useful in areas such as accessing accounts and web pages, where authentication will typically be required.

Entering a password is a process, using either a mobile telephone, an iPad or other pad device, or other known mobile devices, as well as with computer appliances with Internet access, that may take at least eight to ten seconds. Moreover, the process is error prone. The caller may inadvertently type or enunciate a wrong character. Passwords, moreover, are secure in part related to the complexity of the password.

What is needed in the art is a procedure for authentication, especially using mobile devices, that is much quicker, less error prone, and more secure.

BRIEF SUMMARY OF THE INVENTION

In one embodiment of the present invention a method for authenticating a cardholder in an application executing on a mobile computerized appliance is provided, comprising the steps of (a) placing a credit card issued by a financial institution and associated with a cardholder, the credit card enabled for near-field communication (NFC), within the near-field threshold to a mobile communication appliance also enabled for NFC; (b) acquiring a unique digital identifier from the card by NFC; (c) executing software by the computerized appliance, using the identifier to select and launch an application enabling communication by the communication appliance with a first Internet server hosted by the financial institution; and (d) communicating the unique identifier to the server hosted by the financial institution, authorizing the user of the communication device to access and manipulate data in an account belonging to the cardholder.

Also in one embodiment in step (b) data additional to the unique identifier is acquired. Also in one embodiment the communication appliance may be an Android™ operated cellular telephone. There may be an additional step (e) accessing and manipulating data in the account by the person operating the communication appliance.

In another embodiment the communication appliance opens a link to a data repository at a second server, using the unique identifier to locate and acquire further data regarding the cardholder, all or a part of which is communicated by the communication appliance to the first server. In yet another embodiment the cardholder establishes a link to the first server via an appliance that is not NFC enabled, and a link through the mobile computerized appliance that is NFC enabled to the first server as well, and the first server authorizes the cardholder and enables the cardholder to access and manipulate data in the financial account from the appliance that is not NFC enabled.

There may be in the method a step (f) initiating a server function by the cardholder by input at the mobile communication appliance, initiating a transaction from the communication appliance to a call-center hosted by the financial institution, resulting in a dialogue between the cardholder and an agent of the financial institution at the call center.

In another aspect of the invention a system for accessing and manipulating data in a financial account belonging to a cardholder and maintained at a first Internet-connected server is provided, comprising a credit card associated with the cardholder and enabled for Near Field Communication (NFC), the credit card storing a unique identifier, a mobile communication appliance also NFC enabled, executing software from a non-transitory physical medium, wherein bringing the credit card within NFC threshold distance to the communication appliance enables the appliance to acquire the unique identifier, which it uses to launch an application to link to the first Internet-connected server and authenticate the cardholder, enabling the cardholder to access and manipulate data in the financial account.

In one embodiment of the system data additional to the unique identifier is acquired from the credit card by the communication appliance through NFC. In another embodiment the communication appliance may be an Android™ operated cellular telephone. In yet another embodiment the cardholder accesses and manipulates data in the financial account.

In yet another embodiment of the system of the invention the communication appliance opens a link to a data repository at a second server, using the unique identifier to locate and acquire further data regarding the cardholder, all or a part of which is communicated by the communication appliance to the first server. In yet another embodiment the cardholder establishes a link to the first server via an appliance that is not NFC enabled, and a link through the mobile computerized appliance that is NFC enabled to the first server as well, and the first server authorized the cardholder and enables the cardholder to access and manipulate data in the financial account from the appliance that is not NFC enabled. In still another embodiment the cardholder initiates a function at the first server by input at the mobile appliance, which initiates a transaction from the communication appliance to a call-center hosted by the financial institution, resulting in a dialogue between the cardholder and an agent of the financial institution at the call center.

DETAILED DESCRIPTION OF THE INVENTION

Figure 1:
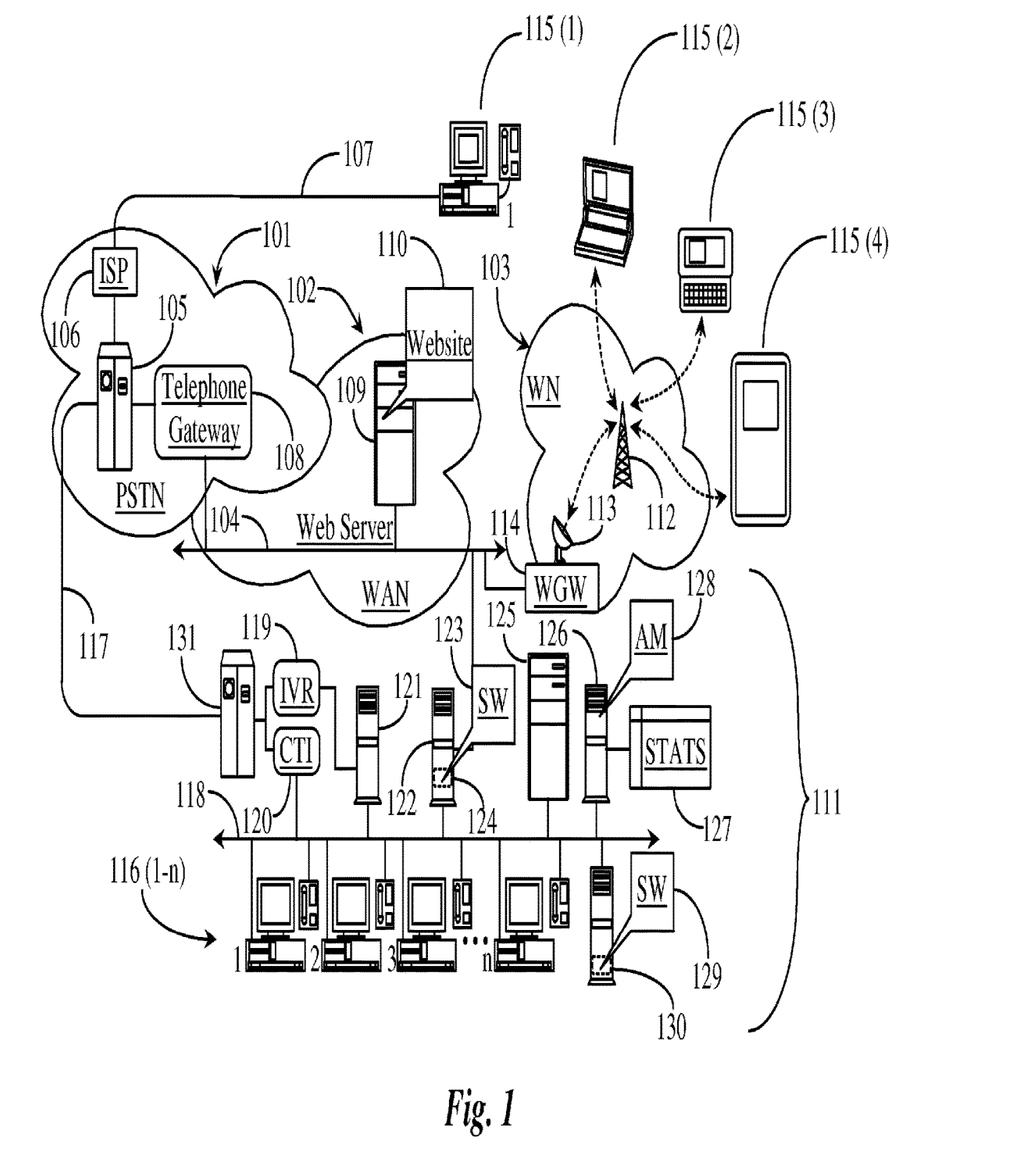
FIG. 1 is an architectural diagram illustrating an arrangement in an embodiment of the present invention.

FIG. 1 is an architectural overview of a networked system in an embodiment of the present invention. This exemplary system comprises a wide-area-network (WAN) 102, a public-switched telephone network (PSTN) 101, and a wireless carrier network (WN) 103. PSTN 101 may be any publicly switched telephone network. WAN 102 may be a corporate or public WAN including the Internet network. Wireless network 103 may be any wireless carrier network and is typically a cellular telephony network.

WAN 102 is the Internet network in a preferred embodiment because of its high public access characteristic, and is referred to herein as Internet 102. Internet 102 is further exemplified by a network backbone 104 representing all of the lines, equipment, and connection points that make up the Internet as a whole. Therefore, there are no geographic limitations to the practice of the present invention.

Network backbone 104 in this example supports a web server 109, which may be hosted by an enterprise engaged in practice of the present invention. Web server 109 has access to a physical, non transitory digital medium storing data and software required to enable function as a web server. In this example, a website 110 is illustrated as one function of server 109. Website 110 represents any website of an enterprise through which customers may communicate with enterprise applications and/or enterprise representatives for the purpose of engaging in products and services. In one embodiment the enterprise may be a financial institution, such as a bank, and the website may provide on-line banking services to customers.

A call center 111 is illustrated in this example, built upon a local area network (LAN) 118 supporting various equipment and facilities for practicing call-center interaction processing. LAN 118 supports a plurality of call center agents dedicated to services for the host of the call center, which may be, in one embodiment, the banking institution that may be the host of website 110. Each call center agent in this example operates from an agent station 116 (1-n). Each agent station 116 (1-n) includes a LAN-connected computing appliance and a switch-connected telephone for illustrative purposes only, as the exact equipment types may vary. The telephone capability at agent stations may be provided through the LAN as digital telephony, as shown in this example, or the telephones may be connected by Destination Number lines to a PSTN switch connected, as is switch 131, to PSTN 101.

PSTN 101 includes a network-level telephone switch 105, which may be an automated call distributor (ACD) or a private branch exchange (PBX), or some other type of telephony switching facility without departing from the spirit and scope of the present invention. Telephone switch 105 is connected to a central office telephone switch 131 associated with the call center via a telephony trunk 117. Switch 131 represents the last hop for callers before being routed to agent stations 116 (1-n) via telephone. Switch 105 in PSTN 101 has connection to network backbone 104 of the Internet network through a telephone gateway 108. Gateway 108 is adapted by software executing from a physical medium to facilitate cross conversion of telephony traffic from the PSTN to the Internet network and from the Internet over the PSTN network.

A variety of consumer appliances 115 (1-4) are illustrated in this example and are meant to include any computing appliances that may be used to access networks 102, 101, and 103. Computing appliance 115 (1) is a desktop computing appliance with a digital telephone and SW executing to enable the telephone. In an alternative embodiment the telephone may be a separate PSTN telephone connected by PSTN land-line to PSTN network 101.

A consumer operating equipment 115 (1) connects with computer 115 (1) to Internet 102 via PSTN land line 107, and an Internet service provider (ISP) 106, in this instance through a gateway 108. The methods of connection may vary upon the equipment used and the available technical avenues for accessing the Internet. Cable modem, telephone modem, satellite, digital services line (DSL), broadband, and WiFi are just some of the available connection methods that may be used to gain access to Internet 102.

Consumer appliances 115 (2), 115 (3) and 115 (4) are wirelessly enabled to connect to network backbone 104 via a cell tower 112, a transceiver 113, and a wireless multimedia gateway (WGW) 114 for bridging communications between wireless network 103 and Internet 102. Consumer appliance 115 (2) is a Laptop computer and 115 (3) is a cellular telephone, such as an iPhone or an Android telephone. Computing appliance 115 (4) is an iPad type device. It may be assumed in this example, that each of the users operating appliances 115 (1-4) may initiate and manage telephone calls, multi-media transactions, emails, and web-browsing sessions.

LAN 118 in call center 111 supports a routing server 122 connected to Internet backbone 104 by way of an Internet access line. Routing server 122 includes a physical digital medium 124 that stores all of the data and software required to enable interaction routing. All transaction requests made by users from appliances 115 (1-4) in communication with website 110 are sent to routing server 122 for distribution to agents operating at agent stations 116 (1-n), managed by routing software that may employ many intelligent routing functions. Telephone switch 131 is enhanced for intelligent routing of voice interactions via a computer telephony integration (CTI) processor 120. CTI processor 120 is connected to switch 131 via a CTI link. CTI processor 120 provides intelligent control over switch 131. Telephone switch 131 also has an interactive voice response (IVR) capability via an IVR 119.

LAN 118 supports an application server 121 that may be employed for serving voice applications to callers. CTI processor 120 is connected to LAN 118 enabling service to the switch and other maintenance through CTI functionality. LAN 118 supports a messaging server 125 adapted with a physical digital medium containing all of the required software and data to enable function as a message server or router. LAN 118 also supports a statistics server 126. Stat server 126 includes a physical digital medium containing all of the software and data required to enable function as a statistics server. Stat server 126 has connection to a repository 127 adapted to contain call center statistics, including, for example, profiles regarding customers and clients of call center 111, and may also store profiles and statistics regarding agents associated with the call center.

Figure 2:
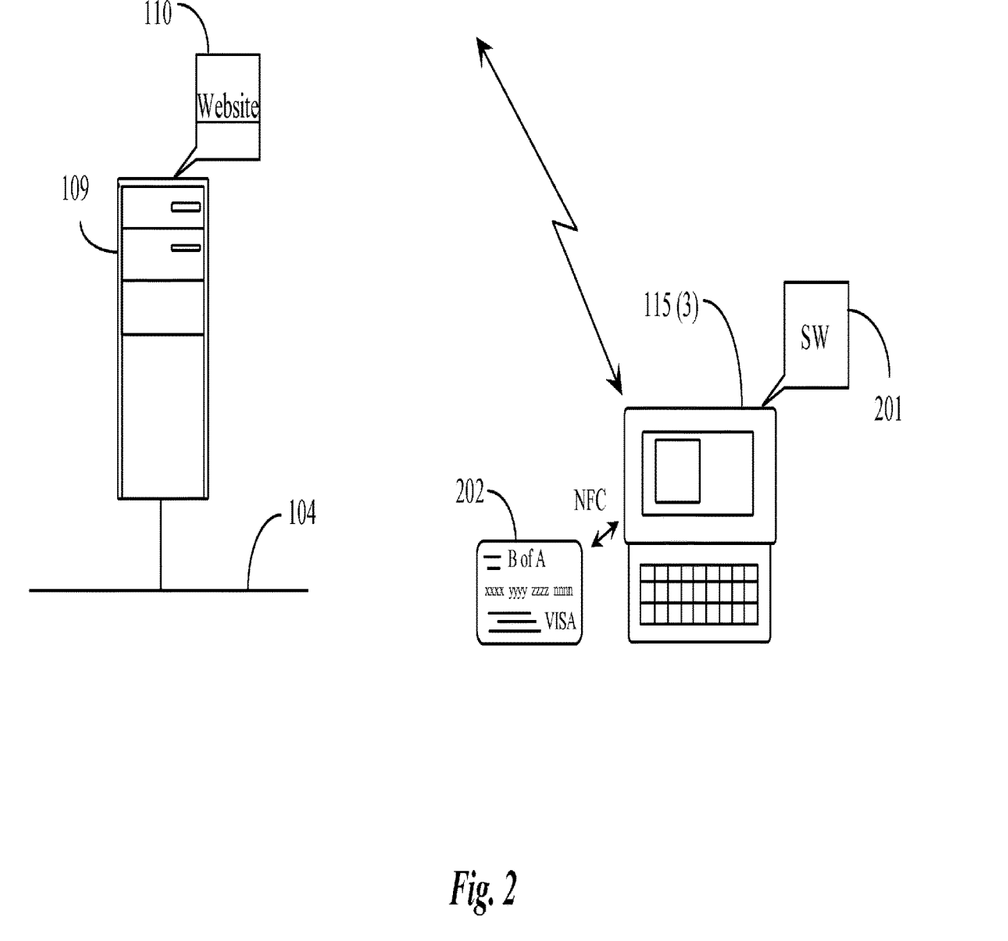
FIG. 2 illustrates functionality in an embodiment of the invention.

In one embodiment of the present invention, illustrated by FIG. 2, server 109 in Internet 102 is hosted by a bank, such as, for example, Bank of America™, and as an example of practice of the invention, a customer of the bank, who has at least one account with the bank, may initiate a transaction from telephone 115 (3) to web server 109 to access her account, to, for example, check the balance in her checking account. In this example the customer has a Bank Card, such as a debit/check card or credit card 202. In many instances the debit card can also be used as a credit card.

Except for the presence and use of bank card 202, the other elements represented in FIG. 2 are all illustrated in FIG. 1 in context with all of the other interconnected equipment in the architecture illustrated in FIG. 1. Much has been left out of FIG. 2 for the sake of simplicity, but all is illustrated in FIG. 1.

In this embodiment telephone 115 (3) is running the Android operating system, and is enabled for Near Field Communication (NFC), such as, for example, the Samsung Galaxy Note Android. The telephone also has an application represented by SW 201, which is an application for accessing the customer's bank account via server 109, and displaying an interactive interface through which the customer may accomplish the instant purpose, such as determining the current account balance. Normally the customer, having a telephone not capable of practicing the instant invention, would invoke the application on the telephone, and log in with username and password to gain access to her account.

It is further known that there is an emerging trend of Near Field Communication (NFC) capability being embedded into credit cards and other common enterprise-issued cards to customers of enterprises like banks, for example. The common application is to make payments at Point-of-Sale by tapping the credit card to the telephone. The communication to the computerized device at the point of sale is the credit-card information, similar to that which would be provided by swiping the card and entering a PIN.

In the present invention the card, in one embodiment, has a digital identifier unique to the cardholder, which SW 201, executing on the telephone, may access by NFC to identify the customer and the card. Accessing the unique identifier in the card invokes the correct application 201 and logs the customer seamlessly into the application. There is no need for the customer to find and invoke the application, or to enter a username and password.

In another embodiment additional data and information may be embedded in card 202 that may be useful to the bank when the customer uses the NFC-enabled card to invoke the bank's application, and this additional information might be used for a variety of purposes.

Figure 3:
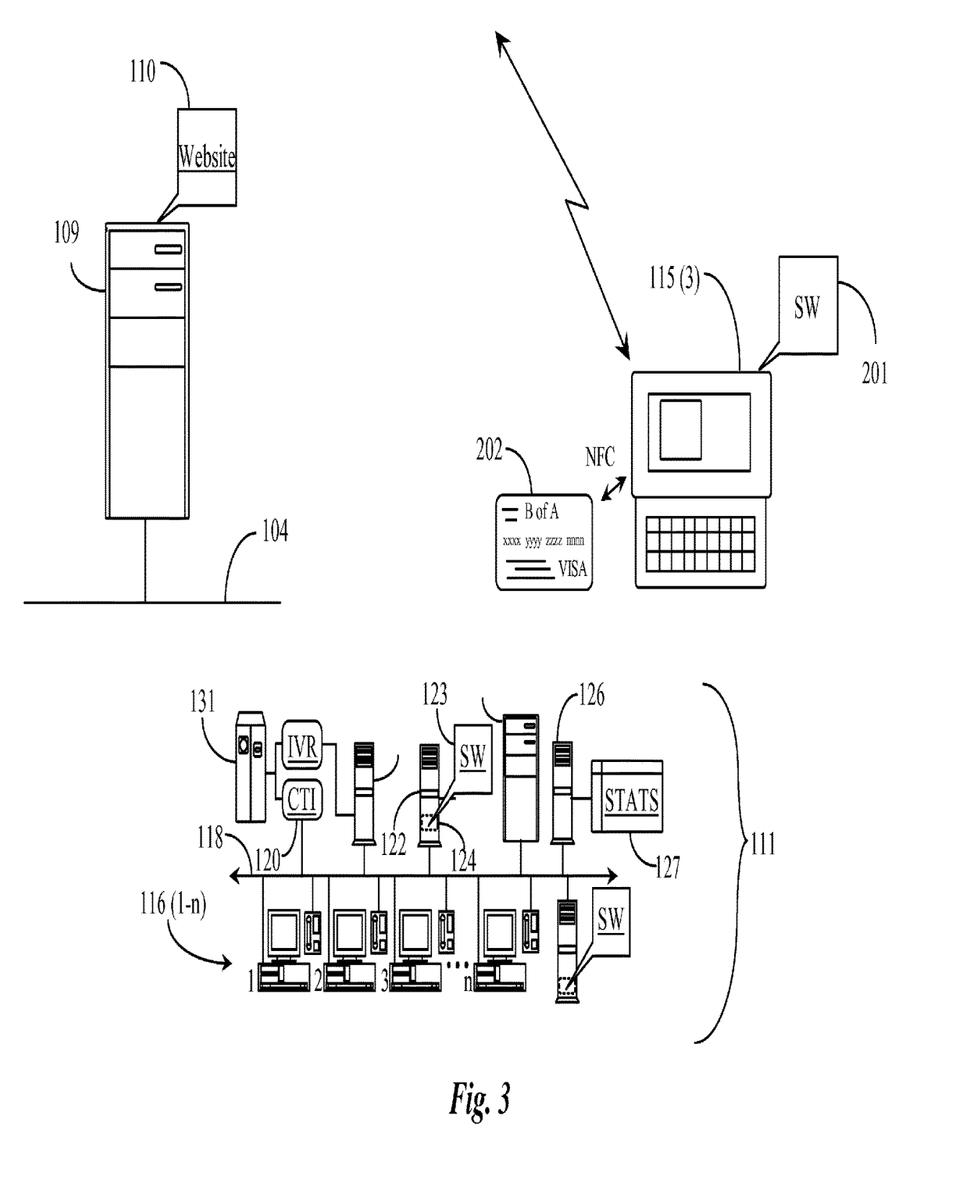
FIG. 3 illustrates functionality in another embodiment of the invention

In yet another embodiment, illustrated by FIG. 3, the bank has a call center 111 which exists to serve the bank's customers primarily through communication with agents at agent stations 116. Again the connectivity of the call center to the bank's server in the Internet and to customer's computerized appliances is not shown, but may be ascertained by reference to FIG. 1. The call center has stat server 126, described briefly above with access to a data repository 127 storing customer profiles. In this embodiment initiating with card to appliance 115 (3) invokes application 201 and the application accesses Stat Server 126 for information about the customer from repository 127, which is stored associated with the unique customer code. The information may be used in a variety of ways.

It is well-known that a customer, interacting with a web site, such as an on-line banking site, may accomplish much, but at some point desire to communicate with an agent at the bank's call center. In current art this typically happens through a link in the web site which connects the customer to the call center, either redirecting the customer, or opening a new path. The customer may be connected first to an IVR such as IVR 119 at the call center, which will then try, through voice application functions, to identify the customer and the customer's purpose. This requires re-entry of username and password, and often other communication as well. In the case where the customer is connected to an agent at the call center, either immediately or after interaction with the IVR, the answering agent may require yet further interaction to authorize certain transactions or access to certain information.

In an embodiment of the present invention the unique identifier and optionally other information acquired from the NFC-enabled card 202 at the beginning of the process interacts with SW at the IVR, or with Stat server 126, and the customer is authenticated without need for all of the manual operations needed in the conventional sense. It is necessary for this functionality that the Stat Server, the IVR, or perhaps the CTI server 120 acting as a router, may execute SW that looks for the identifier and performs the necessary authentication, which may now be transparent to both the agents and the customer.

Figure 4:
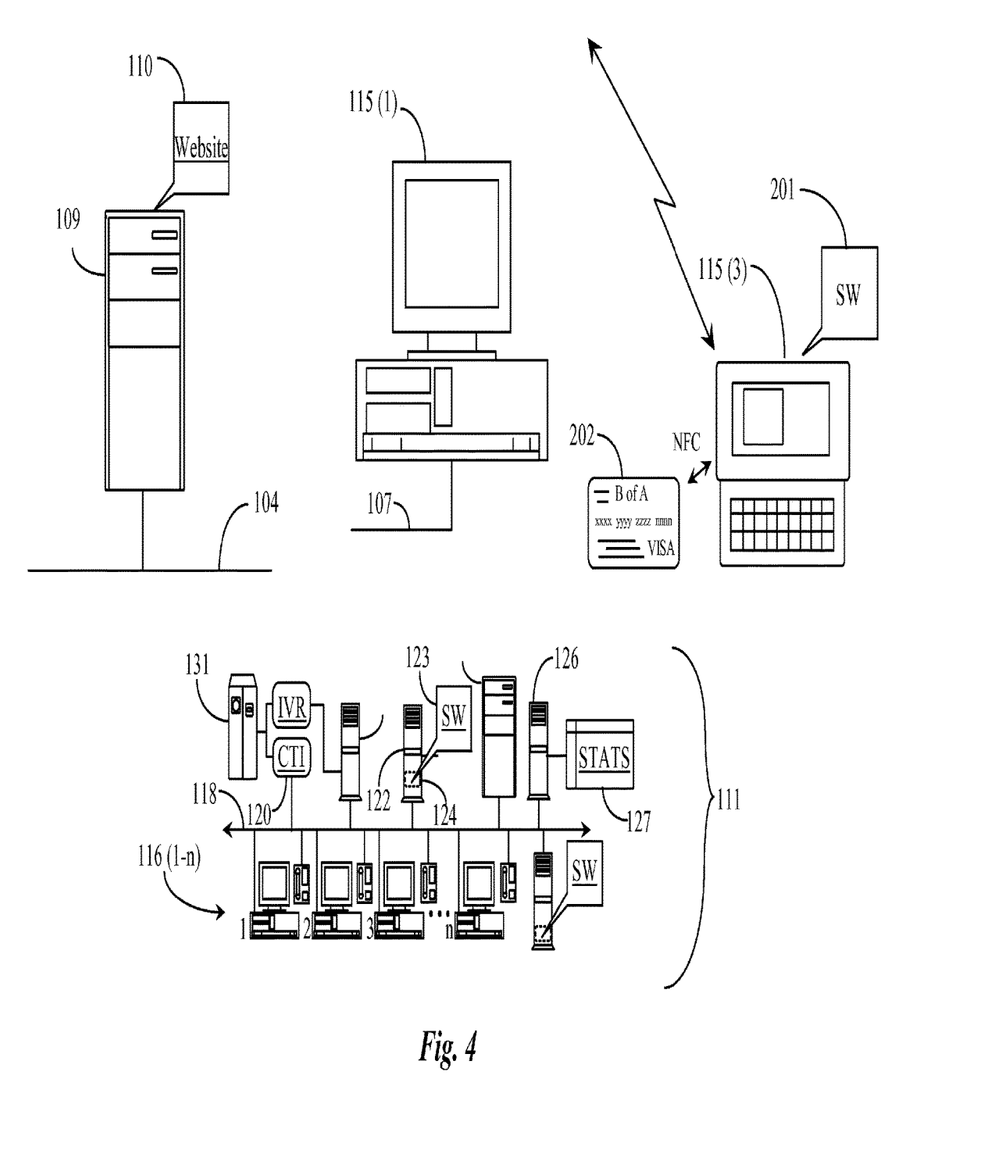
FIG. 4 illustrates functionality and practice in yet another embodiment of the invention.

In yet another embodiment of the invention illustrated by FIG. 4 a customer has invoked an Internet connection for a computer 115 (1) through land-line 107 (see FIG. 1). This example also applies to an Internet connection invoked through, for example a WiFi network to the Internet from laptop 115 (2) or an iPad device 115 (4), none of which in this example are enabled for NFC. In FIG. 4 computer appliance 115 (1) should be thought of as any one of the appliances not enabled for NFC.

In this embodiment the customer, having invoked the application on appliance 115 (1) accessing the bank's web site on server 109 also has his or her NFC enabled telephone 115 (3) at hand and NFC-enabled card 202. The customer taps the card to the telephone, which invokes the telephone application as described above, acquires the unique identifier and optionally other data, and links to the same web site on server 109, where the SW at the server recognizes the customer is connected by appliance 115 (1) as well, and authenticates the customer transparently for the connection to appliance 115(1). In this way, the customer can use the unique ability of the NFC-enabled card and NFC-enabled telephone to authenticate using a variety of appliances that are not NFC enabled.

In one embodiment a third-party enterprise that, for example, provides call center hardware and software to banks and other businesses may provide the SW to operate on the NFC enabled telephones, as well as SW operating on web site 109, and on various servers in the call center associated with the businesses. The third party provider may provide custom features for different ones of such businesses.

An important feature of the present invention in many embodiments is an ability to launch applications quickly and seamlessly on a mobile device, and to authenticate the user of the device in the application. It is important therefore, that the new process be at least as secure as the Username/Password process that is replaced.

In embodiments of the invention, at the very first use the cardholder has to engage the NFC card to the phone and the app that is launched will prompt for a password. The password is not stored on the card. It—that is not stored on the NFC card at all, but is something the user knows and has registered with the enterprise associated with the NFC card, such as a bank as described in embodiments above. It is necessary to do this only the first time the cardholder uses the technique of the invention, hence the security is what one has (the NFC card) and what one knows (the password).

Thereafter, the NFC card is all that is needed to log in—if the card gets stolen it would not work as one would need to know the password to use it on another smartphone. If the card and the phone get stolen together, then a call to the enterprise is required to deactivate the password, card etc (as is done when any credit card is stolen).

This is only a potential security issue if the app is configured to only require a password on the very first time logging into the app from a specific smartphone. IN some embodiments additional layers of security are added, such as, for example, like location. In a location security embodiment the location of the telephone is necessary, limited to certain locations, so approved location is necessary to be able to log in the application. If a different location is a circumstance, then a one-time user name and password is required. In some other embodiments a PIN is required with every use of the NFC-enabled card. A four character PIN is still quicker and easier than a username+password. In still other embodiments other security measures may be implemented. For example, in some cases a card may be paired with a telephone number for the mobile device, or an International Mobile Equipment Identity (IMEI). Other security requirements and procedures, such as biometric input and authentication may also be used.

It is not required that an NFC-enabled card used in practice of the present invention be issued by a financial institution, or that an application booted by proximity of an NFC-enabled card to a mobile device be an account held by a user at a bank or other financial institution. Those descriptions above are a use case and are non-limiting examples. An NFC-enabled card, or an enabled dongle of some sort, may be used to boot an application on a mobile device, and to authenticate the user in a variety if situations, such as, for example, entry into any web-enabled site that requires log-in. The essential innovation and invention is initiating an action other than the well-known payment process at point-of-sale. One might even have, for example, a belt or other item that might have several NFC-enabled dongles at different positions sufficiently separated such that a user might touch the phone to one or another to open the contact list on a mobile phone and call a particular party associated with that particular dongle.

It will be apparent to the skilled person that there are only a few enterprises presently providing NFC-enabled cards, and none of these are enabled with a unique identifier such as is described above for invoking an application and authenticating a user. Further there is no operating software with operation as described above for SW 201. More and more appliances, such as Smart Phones and iPad devices are expected, however, to be NFC enabled in the near future, and these new devices, or new models of existing devices, become useful in embodiments of the present invention.

It will further be apparent to the skilled person that the hardware and software, and functionality described above in various embodiments is exemplary, and there are many equivalent ways that architecture may be implemented and functionality provided that will be within the scope of the present invention. The breadth of the invention is determined by the claims that follow.

The invention claimed is:

1. A method for operating a communication appliance enabled for near field communication (NFC) comprising:
    receiving, by the communication appliance, over a wireless connection, a unique identifier stored on a local device enabled for NFC;
    initializing, by the communication appliance, a login request to a server, wherein the login request, in response to the communication appliance receiving the unique identifier, automatically launches an application configured to launch in response to the communication appliance receiving the unique identifier from the local device on the communication appliance for communication with the server, wherein the communication appliance automatically forwards the unique identifier to the server;
    receiving access, by the communication appliance, in response to the server authenticating the unique identifier, to information stored on the server; and
    displaying, on the communication appliance, content relating to the information stored on the server.

2. The method of claim 1 further comprising: manipulating, by the communication appliance, the information stored on the server in response to a command input by a user of the communication appliance.

3. The method of claim 2, wherein the local device enabled for NFC is a credit card issued by a financial institution, the server is configured to host an interactive website of the financial institution, and the information corresponds to data relating to the credit card or an account of the user.

4. The method of claim 1 further comprising:
    initiating, by the communication appliance, a telephonic communication with a customer contact center in response to a user interaction with a website hosted by the server,
    wherein the communication appliance is authenticated through the unique identifier without additional verification when connected to the customer contact center.

5. The method of claim 1, wherein the communication appliance is a cellular telephone.

6. The method of claim 1 further comprising:
    verifying, by the communication appliance, that the local device enabled for NFC is a previously known device; and
    prompting, by the communication appliance, for a password that is not stored on the local device enabled for NFC in response to being unable to verify the local device enabled for NFC as a previously known device.

7. The method of claim 1 further comprising:
    verifying, by the communication appliance, a geographical location of the communication appliance; and
    prompting, by the communication appliance, for a password in response to being unable to verify that the location of the communication appliance is an approved location.

8. The method of claim 1, wherein the receiving, the initializing, the receiving access, and the displaying, by the communication appliance, is in response to a first login request to the server by an appliance that is not NFC enabled, and the server is configured to allow the appliance that is not NFC enabled access to the information stored on the server in response to the server authenticating the unique identifier through the communication appliance.

9. A communication system enabled for near field communication (NFC) comprising:
    a processor;
    a display coupled to the processor; and
    a memory storing instructions that when executed by the processor, cause the processor to:
        receive, over a wireless connection, a unique identifier stored on a local device enabled for NFC;
        initialize, in response to receiving the unique identifier, a login request to a server, wherein the login request automatically launches an application configured to launch in response to the communication appliance receiving the unique identifier from the local device on a communication appliance for communication with the server, wherein the communication appliance automatically forwards the unique identifier to the server;

receive access, in response to the server authenticating the unique identifier, to information stored on the server; and control the display to display content relating to the information stored on the server.

10. The communication system of claim 9, wherein the instructions further cause the processor to:

manipulate the information stored on the server in response to a command input by a user of the communication system.

11. The communication system of claim 10, wherein the local device enabled for NFC comprises a credit card issued by a financial institution, the server is configured to host an interactive website of the financial institution, and the information corresponds to data relating to the credit card or an account of the user.

12. The communication system of claim 9, wherein the instructions further cause the processor to:

initiate a telephonic communication with a customer contact center in response to a user interaction with a web site hosted by the server, wherein the communication system is configured to be authenticated through the unique identifier without additional verification when connected to the customer contact center.

13. The communication system of claim 9, wherein the communication system comprises a cellular telephone.

14. The communication system of claim 9, wherein the instructions further cause the processor to:

verify that the local device enabled for NFC is a previously known device; and prompt for a password that is not stored on the local device enabled for NFC in response to being unable to verify the local device enabled for NFC as a previously known device.

15. The communication system of claim 9, wherein the instructions further cause the processor to:

verify a geographical location of the communication system; and prompt for a password in response to being unable to verify that the location of the communication appliance is an approved location.

16. The communication system of claim 9, wherein the processor is configured to execute the instructions in response to a first login request to the server by an appliance that is not NFC enabled, and the server is configured to allow the appliance that is not NFC enabled access to the information stored on the server in response to the server authenticating the unique identifier that is transmitted when the processor initializes the login request to the server.

* * * * *